US011709773B2

(12) United States Patent
Iwata

(10) Patent No.: US 11,709,773 B2
(45) Date of Patent: Jul. 25, 2023

(54) COMPUTER-READABLE RECORDING MEDIUM STORING INFORMATION PROCESSING PROGRAM, INFORMATION PROCESSING METHOD, AND INFORMATION PROCESSING DEVICE

(71) Applicant: FUJITSU LIMITED, Kawasaki (JP)

(72) Inventor: Satoshi Iwata, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 45 days.

(21) Appl. No.: 17/558,193

(22) Filed: Dec. 21, 2021

(65) Prior Publication Data

US 2022/0327054 A1    Oct. 13, 2022

(30) Foreign Application Priority Data

Apr. 9, 2021 (JP) .................................. 2021-66807

(51) Int. Cl.
*G06F 12/00* (2006.01)
*G06F 12/0802* (2016.01)

(52) U.S. Cl.
CPC ...... *G06F 12/0802* (2013.01); *G06F 2212/60* (2013.01)

(58) Field of Classification Search
CPC ............. G06F 12/0802; G06F 2212/60; G06F 12/0895; Y02D 10/00
See application file for complete search history.

(56) References Cited

U.S. PATENT DOCUMENTS

| | | | | |
|---|---|---|---|---|
| 8,572,331 | B2* | 10/2013 | Butterworth | G06F 11/08 707/648 |
| 2003/0018662 | A1* | 1/2003 | Li | H04N 21/4884 375/E7.278 |
| 2009/0254693 | A1* | 10/2009 | Karamanolis | G06F 11/1458 711/E12.001 |
| 2011/0307667 | A1 | 12/2011 | Yano et al. | |
| 2012/0079207 | A1* | 3/2012 | Yochai | G06F 11/1451 711/E12.017 |

(Continued)

FOREIGN PATENT DOCUMENTS

| | | |
|---|---|---|
| JP | 2011-103144 A | 5/2011 |
| JP | 2020-9492 A | 1/2020 |

*Primary Examiner* — Shawn X Gu
*Assistant Examiner* — Mohammad S Hasan
(74) *Attorney, Agent, or Firm* — Staas & Halsey LLP

(57) ABSTRACT

A computer-readable recording medium storing an information processing program for causing a computer to execute a process including: specifying an amount of first areas subjected to data update among a plurality of first areas that are contained in a cache storage area and allowed to be synchronized individually from each other with a nonvolatile storage area; and determining whether to individually synchronize the first areas subjected to the data update among the plurality of first areas with the nonvolatile storage area or collectively synchronize a second area that is formed by the plurality of first areas and allowed to be collectively synchronized with the nonvolatile storage area, with the nonvolatile storage area, based on the specified amount, a first processing time taken for synchronization between the first areas and the nonvolatile storage area, and a second processing time taken for synchronization between the second area and the nonvolatile storage area.

8 Claims, 12 Drawing Sheets

(56) References Cited

U.S. PATENT DOCUMENTS

| | | | |
|---|---|---|---|
| 2015/0358406 A1* | 12/2015 | Scheer | G06F 16/00 709/248 |
| 2018/0046378 A1 | 2/2018 | Coburn et al. | |
| 2020/0201814 A1* | 6/2020 | Danilov | G06F 16/9027 |
| 2021/0191861 A1* | 6/2021 | Dalmatov | G06F 12/0802 |

* cited by examiner

COMPUTER-READABLE RECORDING MEDIUM STORING INFORMATION PROCESSING PROGRAM, INFORMATION PROCESSING METHOD, AND INFORMATION PROCESSING DEVICE

CROSS-REFERENCE TO RELATED APPLICATION

This application is based upon and claims the benefit of priority of the prior Japanese Patent Application No. 2021-66807, filed on Apr. 9, 2021, the entire contents of which are incorporated herein by reference.

FIELD

The embodiment discussed herein is related to an information processing program, an information processing method, and an information processing device.

BACKGROUND

Formerly, in order to speed up processing, an expensive and relatively fast-access volatile storage area has been sometimes used for a cache. Then, in some cases, the stored contents of the storage area of the cache are periodically synchronized with an inexpensive and relatively slow-access nonvolatile storage area against a power failure.

As a prior art, for example, there is an art that, when the number of addresses in units of management to which data retained in a cache memory belongs exceeds a predetermined threshold value, executes a data eviction process from the cache memory to a nonvolatile semiconductor memory. In addition, for example, there is a technique that initiates a page fault based on the confirmation that a page of data is not stored in a main memory.

Japanese Laid-open Patent Publication No. 2011-103144 and Japanese Laid-open Patent Publication No. 2020-009492 are disclosed as related art.

SUMMARY

According to an aspect of the embodiments, there is provided a non-transitory computer-readable recording medium storing an information processing program for causing a computer to execute a process including: specifying an amount of first areas subjected to data update among a plurality of first areas that are contained in a cache storage area and allowed to be synchronized individually from each other with a nonvolatile storage area; and determining whether to individually synchronize the first areas subjected to the data update among the plurality of first areas with the nonvolatile storage area or collectively synchronize a second area that is formed by the plurality of first areas and allowed to be collectively synchronized with the nonvolatile storage area, with the nonvolatile storage area, based on the specified amount, a first processing time taken for synchronization between the first areas and the nonvolatile storage area, and a second processing time taken for synchronization between the second area and the nonvolatile storage area.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

However, the former techniques have a disadvantage that the processing time taken for synchronization is likely to increase. For example, when synchronization of a partial area equal to 4 KiB in a storage area of a cache with a nonvolatile storage area is attempted, it sometimes takes a processing time equivalent to the processing time when a partial area equal to 2 MiB in a storage area of a cache is synchronized with a nonvolatile storage area.

In one aspect, the present embodiment aims to reduce the processing time taken for synchronization.

Hereinafter, an embodiment of an information processing program, an information processing method, and an information processing device will be described in detail with reference to the drawings.

(One Example of Information Processing Method According to Embodiment)

Figure 1:
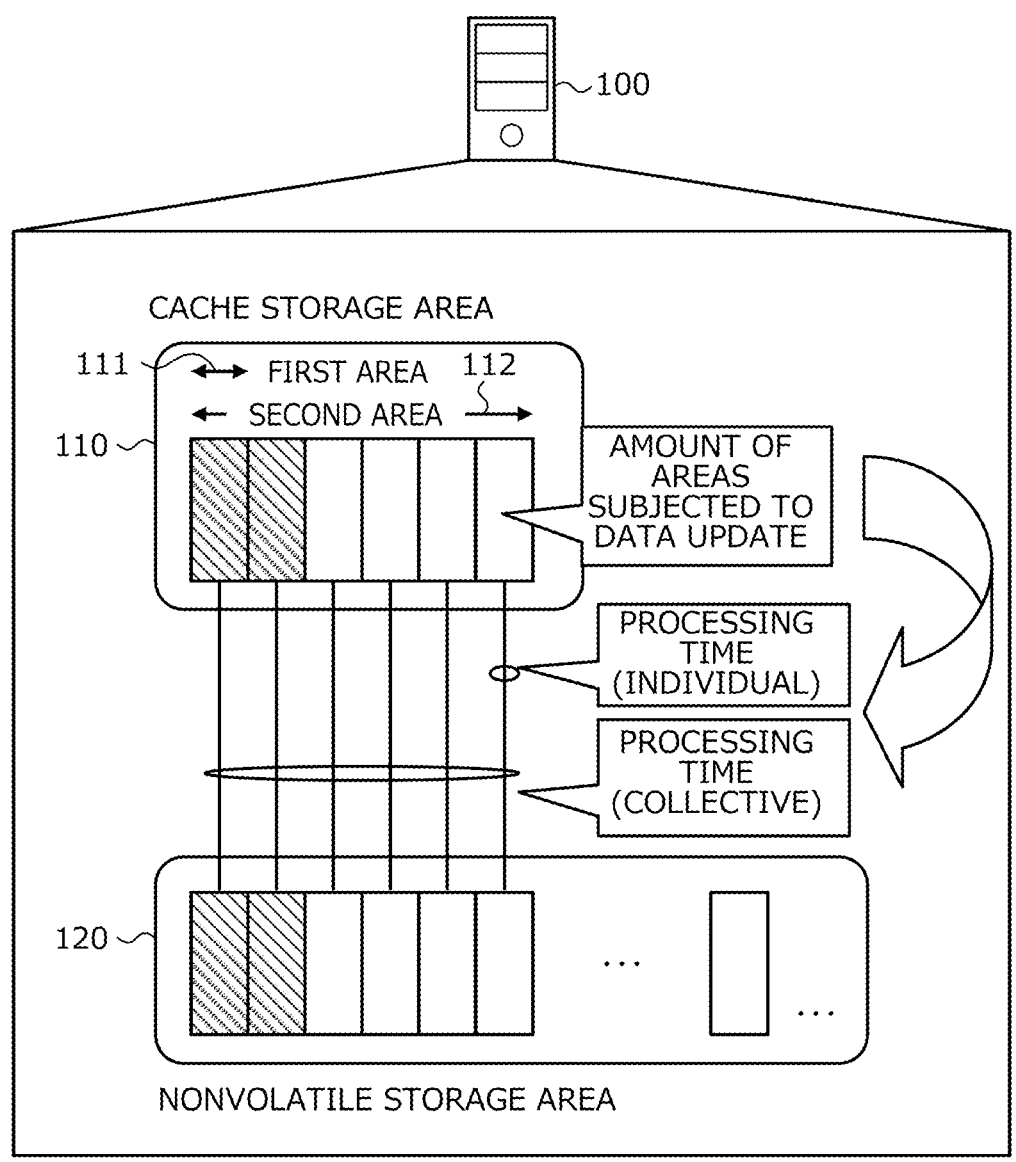
FIG. 1 is an explanatory diagram illustrating one example of an information processing method according to an embodiment.

FIG. 1 is an explanatory diagram illustrating one example of an information processing method according to an embodiment. An information processing device 100 is a computer for reducing the processing time taken for a synchronization process conducted between a cache storage area and a nonvolatile storage area. For example, the information processing device 100 is a server, a personal computer (PC), or the like.

The cache storage area is preferably accessible at a relatively high speed, for example, and tends to be implemented by an expensive and relatively fast-access volatile storage device. On the other hand, the nonvolatile storage area is preferably inexpensive and has a relatively large capacity, for example, and tends to be implemented by an inexpensive and relatively slow-access nonvolatile storage device. In recent years, the nonvolatile storage area is sometimes implemented by a persistent storage device. A persistent storage area is also referred to, for example, as a persistent memory.

The synchronization process is a process of synchronizing the stored contents of the cache storage area with the nonvolatile storage area. The synchronization process is performed, for example, in order to save the stored contents of the cache storage area, which could lose the stored contents due to a power failure, in the nonvolatile storage area against the power failure.

The synchronization process is performed, for example, at regular time intervals. The synchronization process may be performed, for example, when the size of the free area of the cache storage area becomes equal to or less than a certain value and the cache storage area becomes tight. The synchronization process may be performed, for example, in response to a request from an application. For example, the synchronization process may be performed in response to a request issued when an application confirms that data written in the cache storage area is important. The synchronization process does not necessarily have to be performed every time the stored contents of the cache storage area are updated, in order to suppress the processing delay.

However, formerly, there has been a disadvantage that the processing time taken for synchronization process is likely to increase. For example, when synchronization of a partial area equal to 4 KiB in the cache storage area with the nonvolatile storage area is attempted, it sometimes takes a processing time equivalent to the processing time when a partial area equal to 2 MiB in the cache storage area is synchronized with the nonvolatile storage area. The partial area of 4 KiB is, for example, a page of the cache storage area. For example, when synchronization of a partial area equal to 4 KiB in the cache storage area with the nonvolatile storage area is attempted, the processing time sometimes results in 1.7 milliseconds.

For example, it is conceivable that an application requests an operating system (OS) to synchronize a partial area equal to 4 KiB in the cache storage area with the nonvolatile storage area. In this case, in order to speed up the processing by updating consecutive partial areas in the nonvolatile storage area at once, the OS sometimes attempts to synchronize not the partial area equal to 4 KiB but the partial area equal to 2 MiB in the cache storage area with the nonvolatile storage area. As a result, the processing time taken for the synchronization process is likely to increase.

Thus, in the present embodiment, an information processing method capable of reducing the processing time taken for a synchronization process conducted between a cache storage area and a nonvolatile storage area will be described.

In FIG. 1, the information processing device 100 has a cache storage area 110 and a nonvolatile storage area 120. Data in the cache storage area 110 is synchronized with the nonvolatile storage area 120. The cache storage area 110 is split, for example, in units of first areas 111. The first area 111 is called, for example, a page. In the cache storage area 110, there is a second area 112 formed by a plurality of first areas 111.

Each of the first areas 111 can be synchronized with the nonvolatile storage area 120 individually from each other, for example. The second area 112 can be synchronized with the nonvolatile storage area 120 collectively, for example. The information processing device 100 can, for example, perform a first synchronization process in which the first area 111 is individually synchronized with the nonvolatile storage area 120. The information processing device 100 can, for example, perform a second synchronization process in which the second area 112 is collectively synchronized with the nonvolatile storage area 120.

(1-1) The information processing device 100 specifies a first processing time taken for synchronization between the first area 111 and the nonvolatile storage area 120. The first processing time is set by a user, for example. The first processing time may be set, for example, based on a time needed when the first area 111 was individually synchronized with the nonvolatile storage area 120 in the past.

(1-2) The information processing device 100 specifies a second processing time taken for synchronization between the second area 112 and the nonvolatile storage area 120. The second processing time is set by a user, for example. The second processing time may be set, for example, based on a time needed when the second area 112 was collectively synchronized with the nonvolatile storage area 120 in the past.

(1-3) The information processing device 100 specifies the amount of the first areas 111 subjected to data update among the plurality of first areas 111. The data update is, for example, caused and conducted by the application. The information processing device 100 specifies the number of first areas 111 subjected to data updates, for example, based on information indicating whether or not data update has been made in each first area 111. The amount may be expressed as a percentage, for example.

(1-4) The information processing device 100 determines whether to perform the first synchronization process on the first areas 111 subjected to data update or perform the second synchronization process on the second area 112, based on the specified amount, the specified first processing time, and the specified second processing time. For example, if it is confirmed that it is preferable to perform the first synchronization process on the first areas 111 subjected to data update, from the viewpoint of processing time, the information processing device 100 determines to perform the first synchronization process on the first areas 111 subjected to data update. On the other hand, if it is confirmed that it is preferable to perform the second synchronization process on the second area 112 from the viewpoint of processing time, the information processing device 100 determines to perform the second synchronization process on the second area 112.

The information processing device 100 verifies, for example, whether or not the total processing time when the first synchronization process is performed on the first areas 111 equal to the specified amount in the first processing time is equal to or longer than the second processing time. Here, the information processing device 100 determines to perform the second synchronization process on the second area 112 if the total processing time is equal to or longer than the second processing time. On the other hand, the information processing device 100 determines to perform the first synchronization process on the first areas 111 subjected to data update if the total processing time is shorter than the second processing time.

Based on a result of the determination, the information processing device 100 performs the first synchronization process on the first areas 111 subjected to data update or performs the second synchronization process on the second area 112. This allows the information processing device 100 to reduce the processing time taken for the synchronization process conducted between the cache storage area 110 and the nonvolatile storage area 120.

Here, description has been given of a case where the information processing device 100 verifies whether or not the total processing time when the first synchronization process is performed on the first areas 111 equal to the specified amount in the first processing time is equal to or longer than the second processing time. However, the information processing device 100 is not limited to this case. For example, there may be a case where the information processing device 100 determines whether to perform the first synchronization process or perform the second synchronization process, based on whether or not the specified amount is equal to or greater than a threshold value based on the first processing time and the second processing time.

Here, a case where the information processing device 100 includes the cache storage area 110 and the nonvolatile storage area 120 and works independently has been described, but the information processing device 100 is not limited to this case. For example, there may be a case where the information processing device 100 is capable of communicating with another computer including the cache storage area 110 and the nonvolatile storage area 120, and the another computer determines whether to perform the first synchronization process or perform the second synchronization process.

(Hardware Configuration Example of Information Processing Device 100)

Next, a hardware configuration example of the information processing device 100 will be described with reference to FIG. 2.

Figure 2:
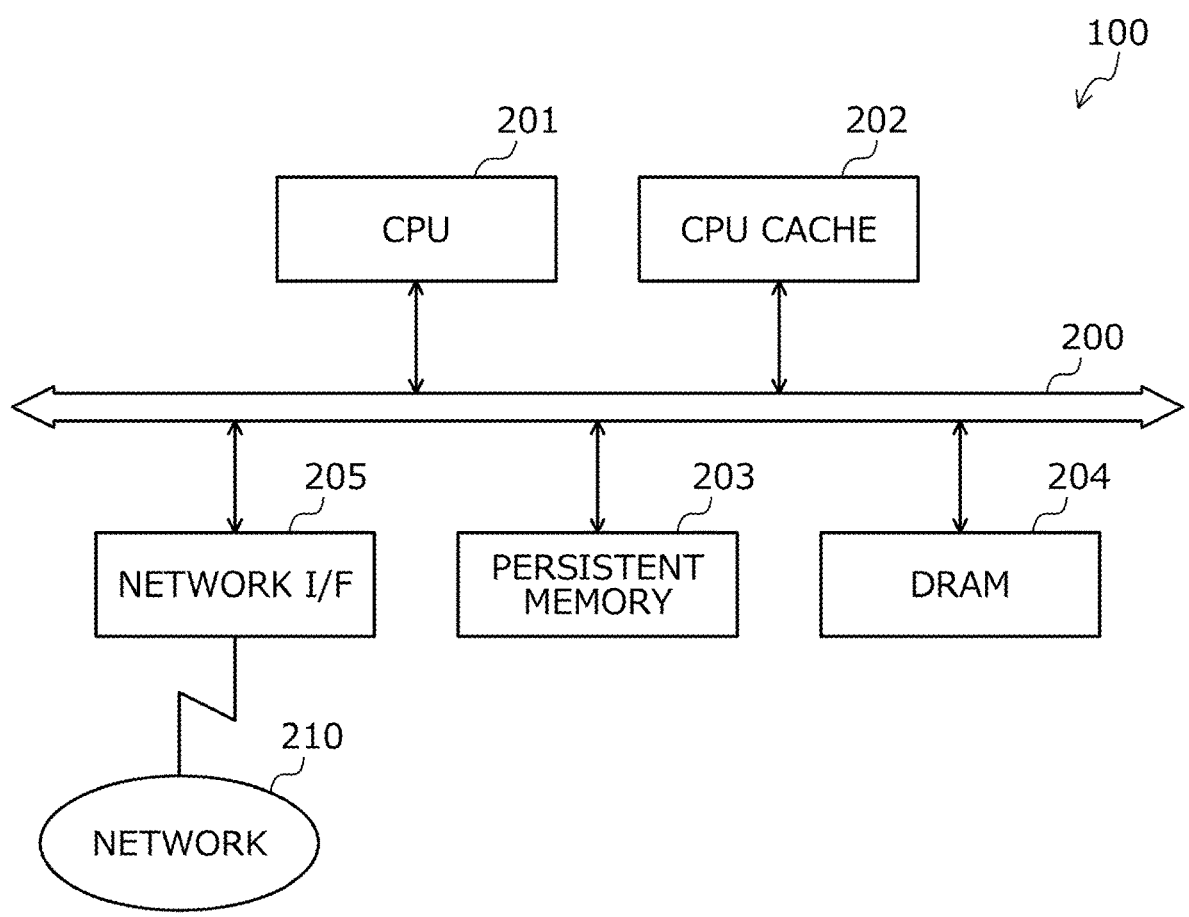
FIG. 2 is a block diagram illustrating a hardware configuration example of an information processing device 100.

FIG. 2 is a block diagram illustrating a hardware configuration example of the information processing device 100. In FIG. 2, the information processing device 100 includes a central processing unit (CPU) 201. The information processing device 100 further includes a CPU cache 202, a persistent memory 203, and a dynamic random access memory (DRAM) 204. The information processing device 100 further includes a network interface (I/F) 205. Furthermore, the respective constituent members are connected to each other by a bus 200.

Here, the CPU 201 is in charge of overall control of the information processing device 100. The CPU cache 202 is used, for example, as a work area for the CPU 201. The CPU cache 202 may be built in the CPU 201, for example. In the persistent memory 203, data stored in the CPU cache 202 is saved, for example, by being synchronized with the CPU cache 202. The DRAM 204 stores, for example, various programs. The programs stored in the DRAM 204 are loaded into the CPU 201 to cause the CPU 201 to execute coded processes.

The network I/F 205 is connected to a network 210 through a communication line and is connected to another computer via the network 210. Then, the network I/F 205 is in charge of an interface between the network 210 and the inside and controls input and output of data from and to another computer. For example, the network I/F 205 is a modem, a local area network (LAN) adapter, or the like.

For example, the information processing device 100 may include a keyboard, a mouse, a display, a printer, a scanner, a microphone, a speaker, or the like in addition to the constituent members described above. In addition, the information processing device 100 may include a recording medium I/F and a recording medium. For example, the recording medium is a disk, a semiconductor memory, a universal serial bus (USB) memory, or the like. The recording medium may be attachable to and detachable from the information processing device 100.

(Example of Relationships Between Various Storage Areas)

Next, an example of relationships between various storage areas of the CPU cache 202, the persistent memory 203, and the DRAM 204 will be described with reference to FIG. 3.

Figure 3:
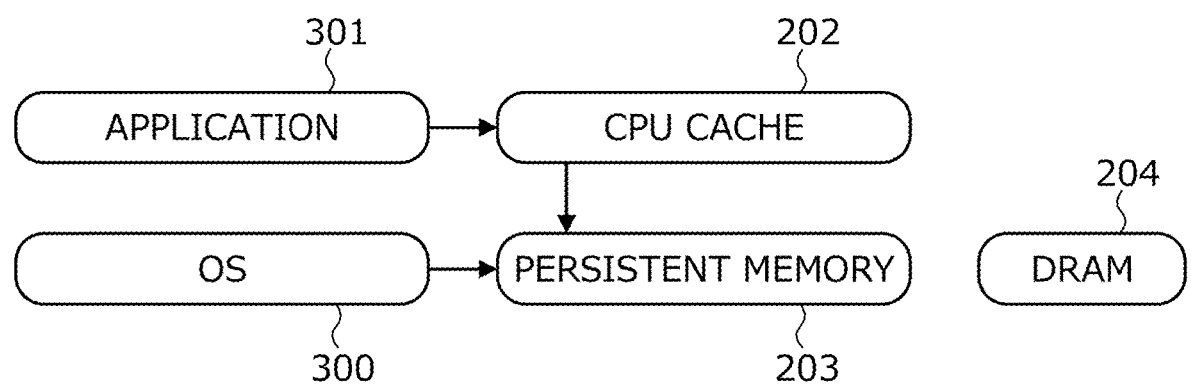
FIG. 3 is an explanatory diagram illustrating an example of relationships between various storage areas.

FIG. 3 is an explanatory diagram illustrating an example of relationships between various storage areas. In FIG. 3, the CPU cache 202 and the persistent memory 203 have a hierarchical relationship. The CPU cache 202 is located at a higher level than the persistent memory 203.

The information processing device 100 includes an OS 300. The information processing device 100 executes an application 301 on the OS 300. The application 301 updates the stored contents of the CPU cache 202. The application 301 updates the stored contents of any page of the CPU cache 202, for example. The page has, for example, 4 KiB.

When the page is updated, the OS 300 uses the DRAM 204 to manage that the page has shifted to being dirty. Being dirty indicates, for example, that the stored contents of the page has been updated. Being dirty suggests that, for example, it is preferable to synchronize the stored contents of the page with the persistent memory 203. The OS 300 manages whether or not each page is dirty, using, for example, a dirty management table 400 prepared in the DRAM 204, which will be described later in FIG. 4.

The OS 300 detects a trigger to perform the synchronization process between the CPU cache 202 and the persistent memory 203. The OS 300 detects, for example, that a synchronization request has been received from the application 301, as a trigger. The OS 300 detects, for example, a timer signal that occurs at regular time intervals, as a trigger. When detecting the trigger, the OS 300 refers to the DRAM 204 to perform the synchronization process between the CPU cache 202 and the persistent memory 203.

(Stored Contents of Dirty Management Table 400)

Next, an example of the stored contents of the dirty management table 400 will be described with reference to FIG. 4. The dirty management table 400 is implemented by a storage area of the DRAM 204 or the like of the information processing device 100 illustrated in FIG. 2, for example.

Figure 4:
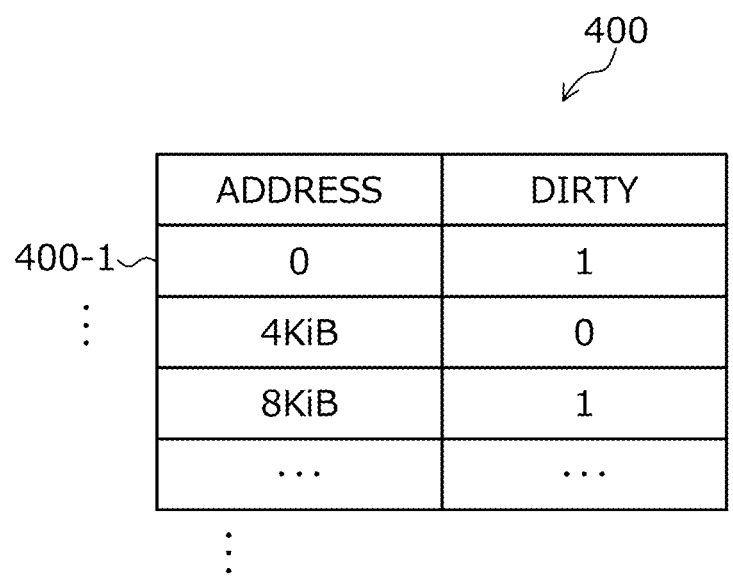
FIG. 4 is an explanatory diagram illustrating an example of the stored contents of a dirty management table 400.

FIG. 4 is an explanatory diagram illustrating an example of the stored contents of the dirty management table 400. As illustrated in FIG. 4, the dirty management table 400 has fields for an address and dirtying. In the dirty management table 400, dirty management information is stored as a record 400-$a$ by setting information in the respective fields for each page. The letter a represents any integer.

The field for the address is set with an address that makes it possible to specify an area of the persistent memory 203 corresponding to the page. The area is, for example, the synchronization destination of the page. The field for dirtying is set with flag information indicating whether or not the above page is dirty. Being dirty indicates, for example, that the stored contents of the above page has been updated. Being dirty suggests that it is preferable to synchronize the above page with the area of the persistent memory 203 corresponding to the above page. The dirty management table 400 may be generated individually for every 2 MiB of the persistent memory 203, for example.

(Functional Configuration Example of Information Processing Device 100)

Next, a functional configuration example of the information processing device 100 will be described with reference to FIG. 5.

Figure 5:
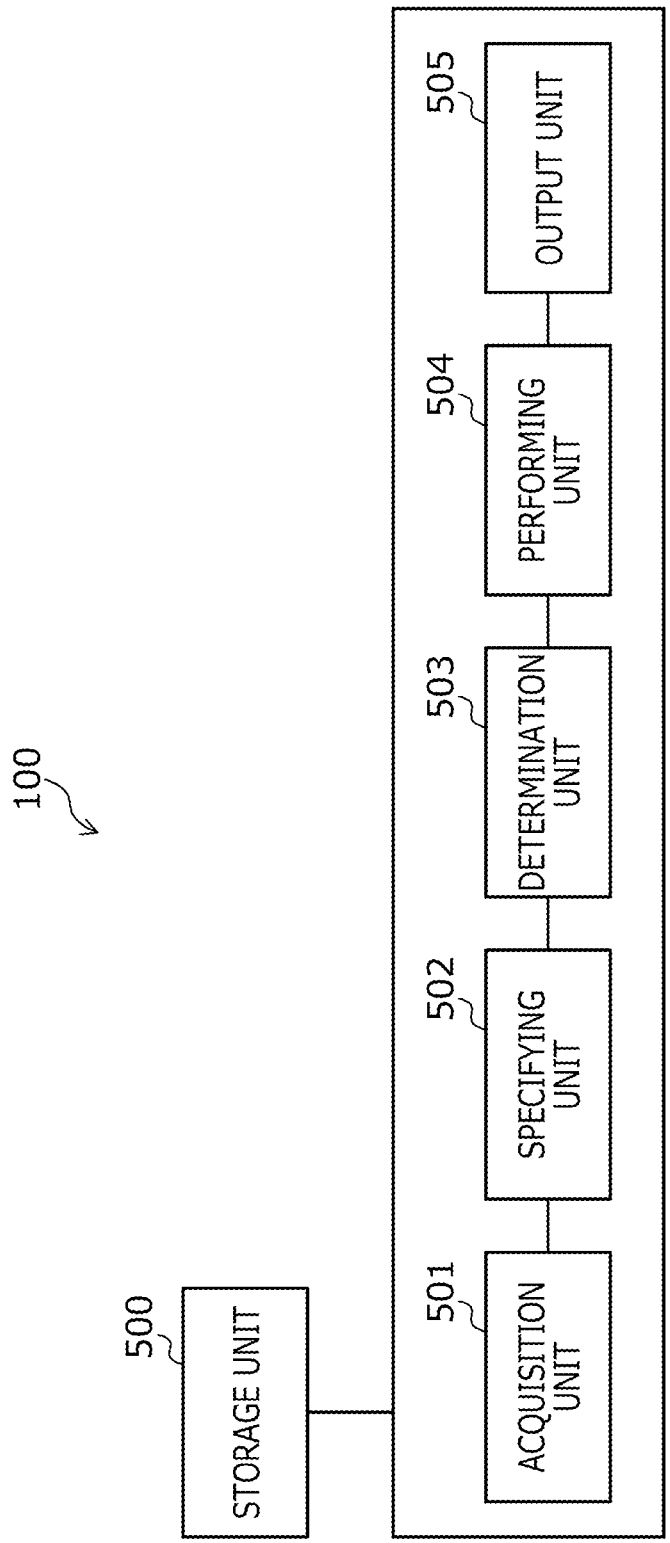
FIG. 5 is a block diagram illustrating a functional configuration example of the information processing device 100.

FIG. 5 is a block diagram illustrating a functional configuration example of the information processing device 100. The information processing device 100 includes a storage unit 500, an acquisition unit 501, a specifying unit 502, a determination unit 503, a performing unit 504, and an output unit 505.

The storage unit 500 is implemented by a storage area of the DRAM 204 or the like illustrated in FIG. 2, for example. Hereinafter, a case where the storage unit 500 is included in the information processing device 100 will be described. However, the storage unit 500 is not limited to this case. For example, there may be a case where the storage unit 500 is included in a device different from the information processing device 100, and the information processing device 100 is allowed to refer to the stored contents of the storage unit 500.

The acquisition unit 501 to the output unit 505 function as an example of a control unit. Precisely, for example, the acquisition unit 501 to the output unit 505 implement functions thereof by causing the CPU 201 to execute a program stored in the storage area of the DRAM 204 or the like illustrated in FIG. 2 or by the network I/F 205. The acquisition unit 501 to the output unit 505 are implemented on the OS. A processing result of each functional unit is stored in, for example, a storage area of the DRAM 204 or the like illustrated in FIG. 2.

The storage unit 500 stores various types of information referred to or updated in the processing of each functional unit. The storage unit 500 updates first information indicating the first processing time. The first processing time is the processing time taken for the first synchronization process conducted between the first area and the nonvolatile storage area. The first area is included in the cache storage area and is an area that can be individually synchronized with the nonvolatile storage area. The cache storage area is, for example, the CPU cache 202. The first area is, for example, a page included in the cache storage area. The first area has, for example, 4 KiB. The nonvolatile storage area is, for example, the persistent memory 203. The first information directly indicates the first processing time, for example. The first information may indirectly indicate the first processing time, for example. For example, the first information is a mathematical formula or the like that makes it possible to calculate the first processing time.

The storage unit 500 updates second information indicating the second processing time. The second processing time is the processing time taken for the second synchronization process conducted between the second area and the nonvolatile storage area. The second area is an area that is formed by a plurality of first areas and can be collectively synchronized with the nonvolatile storage area. The second area has, for example, 2 MiB. The second information directly indicates the second processing time, for example. The second information may indirectly indicate the second processing time, for example. For example, the second information is a mathematical formula or the like that makes it possible to calculate the second processing time.

The storage unit 500 stores third information that makes it possible to specify the amount of the first areas subjected to data update. The third information directly indicates the amount of the first areas subjected to data update, for example. The amount is, for example, a number. The amount may be, for example, a percentage. The third information may indirectly indicate the amount of the first areas subjected to data update, for example. For example, the third information is information indicating whether or not data update has been made in each first area among the plurality of first areas. Whether or not the data update has been made corresponds to whether or not to be dirty. The storage unit 500 stores, for example, the dirty management table 400.

The acquisition unit 501 acquires various types of information to be used for the processing of each functional unit. The acquisition unit 501 stores the acquired various types of information in the storage unit 500 or outputs the acquired various types of information to each functional unit. Furthermore, the acquisition unit 501 may output the various types of information stored in the storage unit 500 to each functional unit. The acquisition unit 501 acquires the various types of information based on, for example, an operation input by the user. The acquisition unit 501 may receive the various types of information from a device different from the information processing device 100, for example.

The acquisition unit 501 acquires the first information. The acquisition unit 501 acquires the first information, for example, by reading the first information from the storage unit 500. The acquisition unit 501 acquires the first information, for example, by receiving the first information from another computer. The acquisition unit 501 acquires the first information by accepting an input of the first information based on an operation input by the user, for example.

The acquisition unit 501 acquires the second information. The acquisition unit 501 acquires the second information, for example, by reading the second information from the storage unit 500. The acquisition unit 501 acquires the second information, for example, by receiving the second information from another computer. The acquisition unit 501 acquires the second information by accepting an input of the second information based on an operation input by the user, for example.

The acquisition unit 501 acquires the third information. The acquisition unit 501 acquires the dirty management table 400 as the third information, for example. For example, the acquisition unit 501 acquires the dirty management table 400 by reading the dirty management table 400 from the storage unit 500. For example, the acquisition unit 501 acquires the dirty management table 400 by receiving the dirty management table 400 from another computer. The acquisition unit 501 may acquire, for example, the third information that directly indicates the amount of the first areas subjected to data update.

The acquisition unit 501 may accept a start trigger to start the processing of any one of the functional units. The start trigger is, for example, a predetermined operation input made by the user. The start trigger may be, for example, the receipt of predetermined information from another computer. The start trigger may be, for example, the output of predetermined information by any one of the functional units.

For example, the acquisition unit 501 accepts the receipt of the synchronization request from an application that accesses the cache storage area, as a start trigger to start the processing of the specifying unit 502, the determination unit 503, and the performing unit 504. For example, the acquisition unit 501 accepts the detection of the timer signal that occurs at regular time intervals, as a start trigger to start the processing of the specifying unit 502, the determination unit 503, and the performing unit 504.

The specifying unit 502 specifies the first processing time based on the first information. The specifying unit 502 specifies the first processing time directly indicated by the first information, for example. The specifying unit 502 may specify the first processing time by calculating the first processing time based on, for example, a mathematical formula that is the first information. This allows the specifying unit 502 to obtain information as a guideline for determining whether to perform the first synchronization process or perform the second synchronization process and to make the information available to the determination unit 503.

The specifying unit 502 specifies the second processing time based on the second information. The specifying unit 502 specifies the second processing time directly indicated by the second information, for example. The specifying unit 502 may specify the second processing time by calculating the second processing time based on, for example, a mathematical formula that is the second information. This allows the specifying unit 502 to obtain information as a guideline for determining whether to perform the first synchronization process or perform the second synchronization process and to make the information available to the determination unit 503.

The specifying unit 502 specifies the amount of the first areas subjected to data update among the plurality of first areas. The specifying unit 502 specifies the amount of the first areas subjected to data update, which is directly indicated by the second information, for example. The specifying unit 502 specifies the number of the first areas subjected to data update by counting the first areas subjected to data update among the plurality of first areas, based on the third information, for example.

For example, the specifying unit 502 specifies the number of the first areas subjected to data update by counting the dirty first areas among the plurality of first areas, based on the dirty management table 400. This allows the specifying unit 502 to obtain information as a guideline for determining whether to perform the first synchronization process or perform the second synchronization process and to make the information available to the determination unit 503.

Based on the specified amount, the first processing time, and the second processing time, the determination unit 503 determines whether to individually synchronize the first areas subjected to data update among the plurality of first areas with the nonvolatile storage area or collectively synchronize the second area with the nonvolatile storage area.

For example, when the specified amount is less than the threshold value based on the first processing time and the second processing time, the determination unit 503 determines to individually synchronize the first areas subjected to data update among the plurality of first areas with the nonvolatile storage area. On the other hand, for example, when the specified amount is equal to or greater than the threshold value based on the first processing time and the second processing time, the determination unit 503 determines to collectively synchronize the second area with the nonvolatile storage area.

For example, the determination unit 503 sets a value obtained by dividing the second processing time by the first processing time, as the threshold value. Then, for example, when the specified number is less than the set threshold value, the determination unit 503 determines to individually synchronize the first areas subjected to data update among the plurality of first areas with the nonvolatile storage area. On the other hand, for example, the determination unit 503 determines to collectively synchronize the second area with the nonvolatile storage area when the specified number is equal to or greater than the set threshold value. This allows the determination unit 503 to reduce the processing time taken for synchronization.

For example, the determination unit 503 may verify whether or not a value obtained by multiplying the specified number by the first processing time is equal to or longer than the second processing time. Then, for example, if the value is shorter than the second processing time, the determination unit 503 determines to individually synchronize the first areas subjected to data update with the nonvolatile storage area. On the other hand, for example, the determination unit 503 determines to collectively synchronize the second area with the nonvolatile storage area if the value is equal to or longer than the second processing time. This allows the determination unit 503 to reduce the processing time taken for synchronization.

When it is determined that the first areas subjected to data update among the plurality of first areas are to be individually synchronized with the nonvolatile storage area, the performing unit 504 performs the first synchronization process that individually synchronizes the first areas subjected to data update with the nonvolatile storage area. This allows the performing unit 504 to individually synchronize the first areas with the nonvolatile storage area appropriately and protect the stored contents of the first areas. In addition, the performing unit 504 may individually synchronize the first areas with the nonvolatile storage area in a relatively short processing time.

When it is determined that the second area is to be collectively synchronized with the nonvolatile storage area, the performing unit 504 performs the second synchronization process that collectively synchronizes the second area with the nonvolatile storage area. This allows the performing unit 504 to collectively synchronize the second area with the nonvolatile storage area appropriately and protect the stored contents of the second area. In addition, the performing unit 504 may synchronize the first areas that have been subjected to data update and are contained in the second area, with the nonvolatile storage area in a relatively short processing time.

When the first synchronization process is performed, the performing unit 504 updates the first information indicating the first processing time, based on the needed time taken for the first synchronization process. For example, when the first synchronization process is performed, the performing unit 504 measures the needed time taken for the first synchronization process. Then, for example, the performing unit 504 statistically calculates the first processing time using the measured needed time and creates or updates the first information indicating the first processing time. This allows the performing unit 504 to make the first information accurately indicate the first processing time and to improve the determination accuracy of the determination unit 503.

When the second synchronization process is performed, the performing unit 504 updates the second information indicating the second processing time, based on the needed time taken for the second synchronization process. For example, when the second synchronization process is performed, the performing unit 504 measures the needed time taken for the second synchronization process. Then, for example, the performing unit 504 statistically calculates the second processing time using the measured needed time and creates or updates the second information indicating the second processing time. This allows the performing unit 504 to make the second information accurately indicate the second processing time and to improve the determination accuracy of the determination unit 503.

The output unit 505 outputs a processing result of at least any one of the functional units. An output format is, for example, display on a display, print output to a printer, transmission to an external device by the network I/F 205, or storage to a storage area of the DRAM 204 or the like. This allows the output unit 505 to make the user be notified of a processing result of at least any one of the functional units and to improve the convenience of the information processing device 100. The output unit 505 outputs, for example, a notification that the first synchronization process has been completed. The output unit 505 outputs, for example, a notification that the second synchronization process has been completed.

(Action Example of Information Processing Device 100)

Next, an action example of the information processing device 100 will be described with reference to FIGS. 6 to 10. First, an example of the data structure of the persistent memory 203 will be described with reference to FIG. 6.

Figure 6:
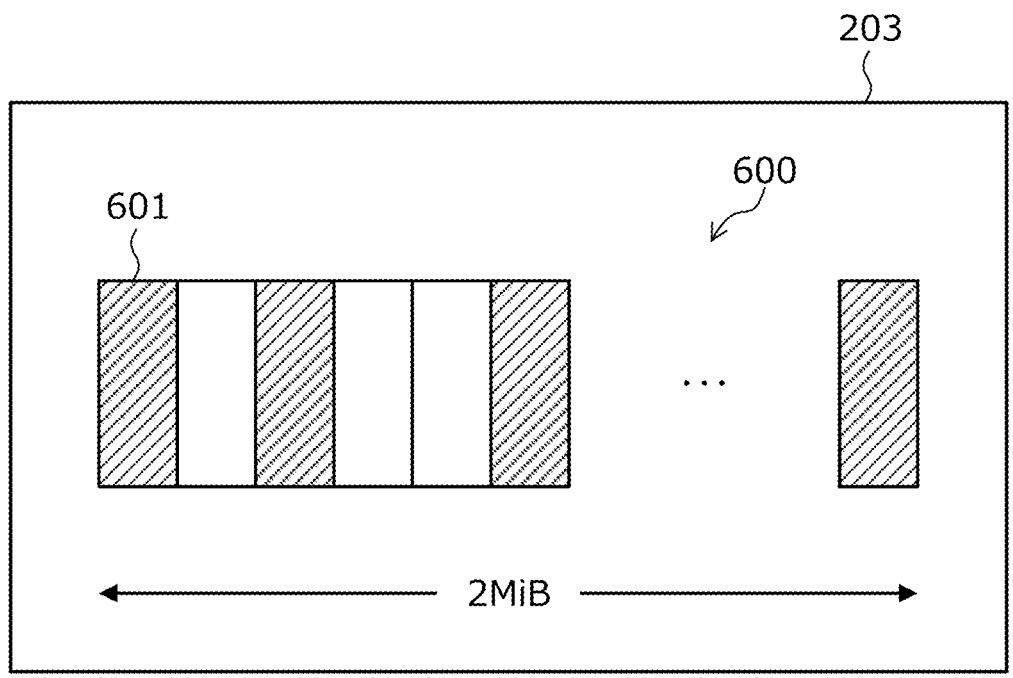
FIG. 6 is an explanatory diagram illustrating an example of a data structure of a persistent memory 203.

FIG. 6 is an explanatory diagram illustrating an example of a data structure of the persistent memory 203. In FIG. 6, the persistent memory 203 contains a plurality of 2-MiB areas 600 each containing 512 4-KiB areas 601. The area 601 can be a saving destination for the stored contents of the page contained in the CPU cache 202. The area 600 can be a saving destination for the stored contents of a maximum of 512 pages contained in the CPU cache 202.

The area 601 can be individually synchronized with any page contained in the CPU cache 202 by a 4-KiB individual synchronization process. The area 600 can be collectively synchronized with 512 pages contained in the CPU cache 202 by a 2-MiB collective synchronization process. Next, an example in which the OS 300 manages dirtying will be described with reference to FIG. 7.

Figure 7:
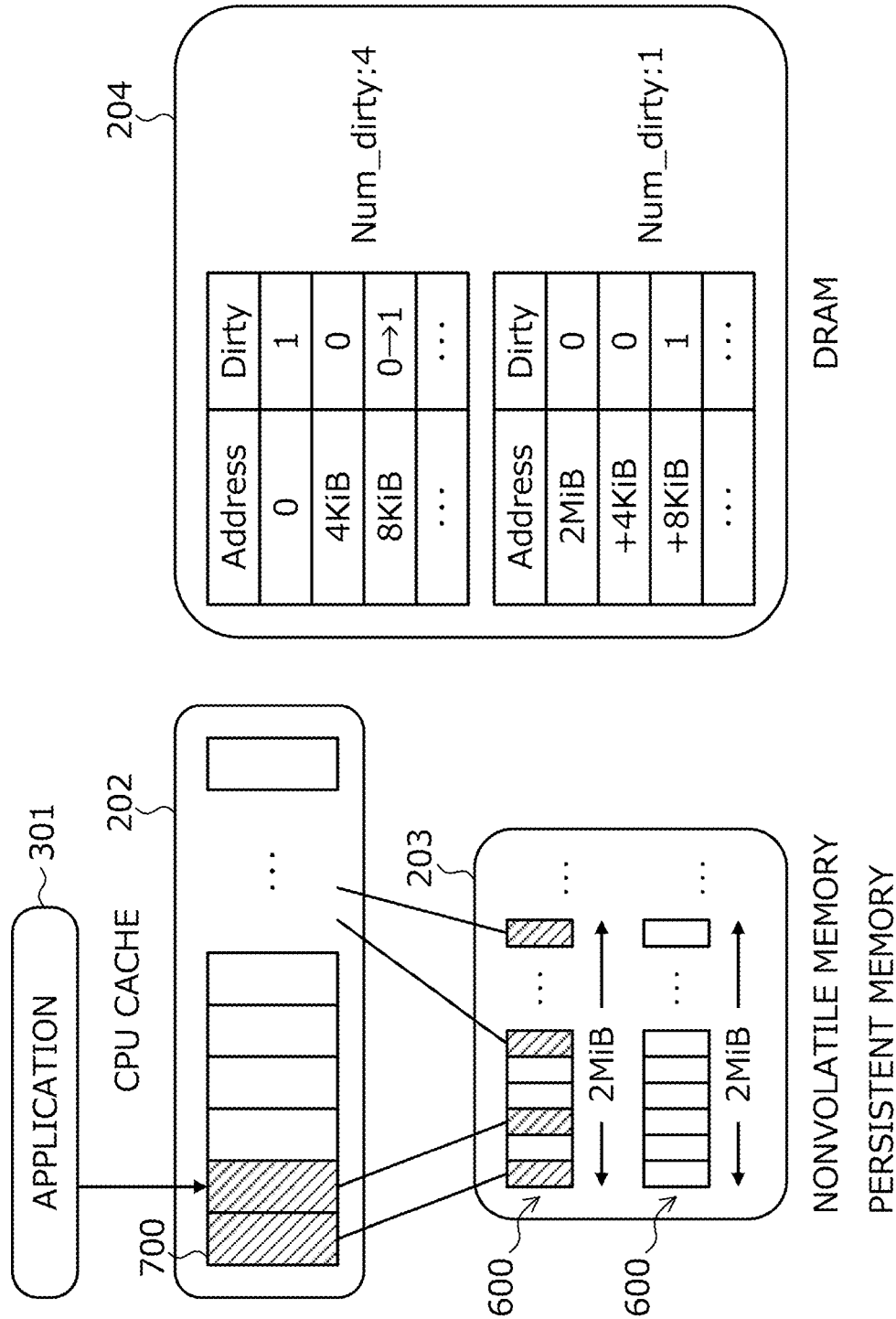
FIG. 7 is an explanatory diagram illustrating an example of managing dirtying.

FIG. 7 is an explanatory diagram illustrating an example of managing dirtying. In FIG. 7, it is assumed that the application 301 has updated the stored contents of a page 700 of the CPU cache 202. The OS 300 detects that the stored contents of the page 700 of the CPU cache 202 have been updated. The OS 300 detects that the stored contents of the page 700 of the CPU cache 202 have been updated, by receiving an update notification from the application 301, for example.

When detecting that the stored contents of the page 700 of the CPU cache 202 have been updated, the OS 300 manages the flag information indicating that the page 700 is dirty, in association with the area 601 corresponding to the page 700. For example, if the area 601 corresponding to the page 700 is the area 601 located at the position separated by 8 KiB from the beginning of the top area 600, the OS 300 associates the flag information "1" indicating that the page 700 is dirty, with the address "8 KiB" to manage.

For example, the OS 300 updates the flag information associated with the address "8 KiB" to "1" in the dirty management table 400 that is stored in the DRAM 204 and corresponds to the top area 600. This allows the OS 300 to record a guideline for confirming which synchronization process among the 4-KiB individual synchronization process and the 2-MiB collective synchronization process is preferable to perform from the viewpoint of processing time. Next, an example in which the OS 300 determines which synchronization process to perform among the 4-KiB individual synchronization process and the 2-MiB collective synchronization process will be described with reference to FIG. 8.

Figure 8:
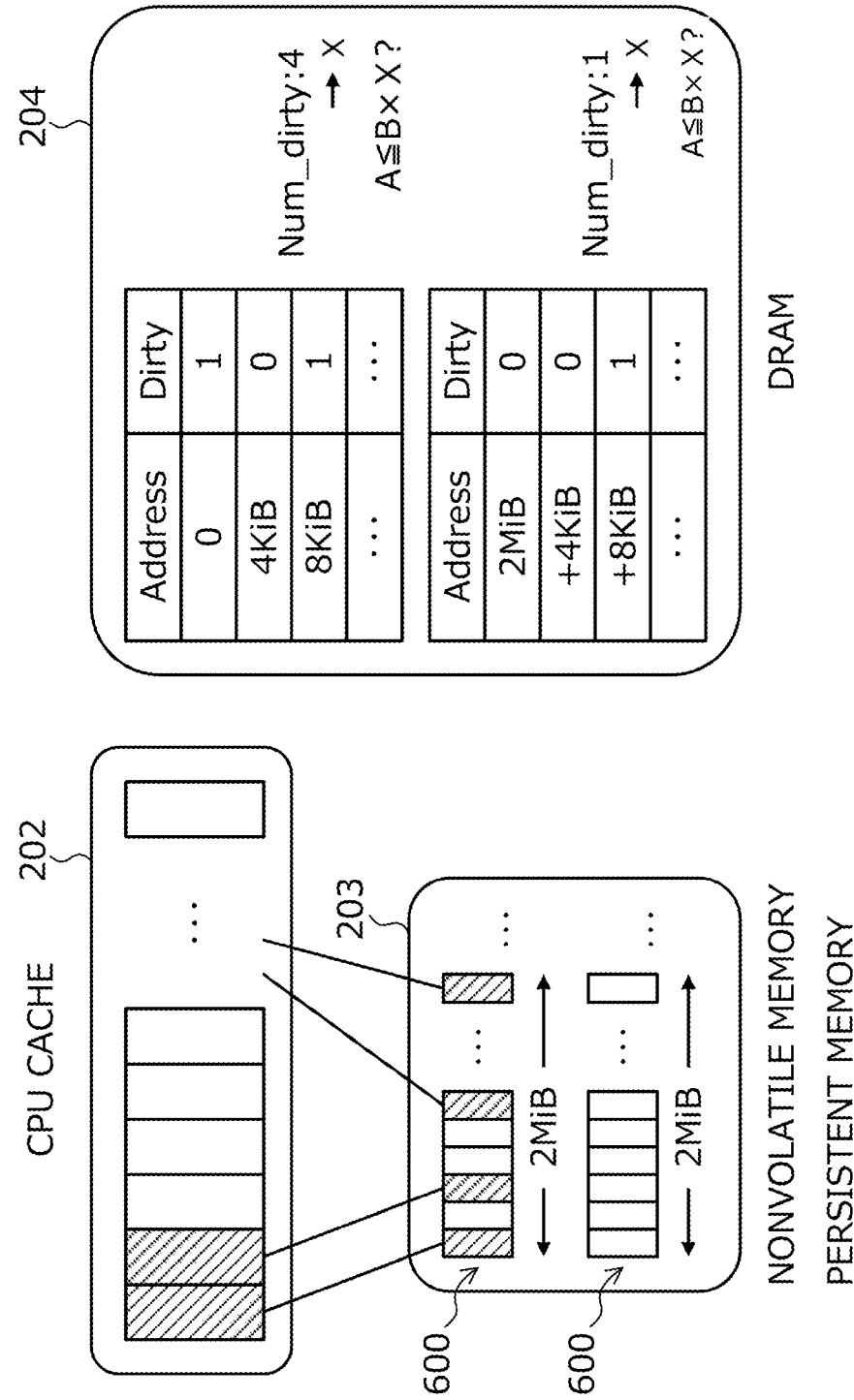
FIG. 8 is an explanatory diagram illustrating an example of determining which synchronization process is to be performed.

FIG. 8 is an explanatory diagram illustrating an example of determining which synchronization process is to be performed. In FIG. 8, the OS 300 determines which synchronization process to perform among the 4-KiB individual synchronization process and the 2-MiB collective synchronization process for each area 600, based on a processing time A for the 2-MiB collective synchronization process and a processing time B for the 4-KiB individual synchronization process. The processing time A is, for example, 91 times the processing time B. For example, the processing time A is 1.7 milliseconds. For example, the processing time B is 18 microseconds.

For example, the OS 300 counts the number Num_dirty of pieces of the flag information "1" in the dirty management table 400 corresponding to the area 600 for each area 600 and sets the counted number Num_dirty to the number of updated pages X. Then, the OS 300 verifies, for example, whether or not the processing time A≤the processing time B×the number of updated pages X holds, for each area 600.

Here, for example, if the processing time A≤the processing time B×the number of updated pages X holds for any of the areas 600, the OS 300 determines to perform the 2-MiB collective synchronization process on the 512 pages corresponding to the area 600. On the other hand, for example, the OS 300 determines to perform the 4-KiB individual synchronization process on each of the dirty pages among the 512 pages corresponding to the area 600, if the processing time A≤the processing time B×the number of updated pages X does not hold for one of the areas 600.

This allows the OS 300 to reduce the processing time taken to synchronize the dirty page with the area 600. Next, an example in which the OS 300 individually performs the 4-KiB individual synchronization process on each of the dirty pages among the 512 pages corresponding to any of the areas 600 will be described with reference to FIG. 9.

Figure 9:
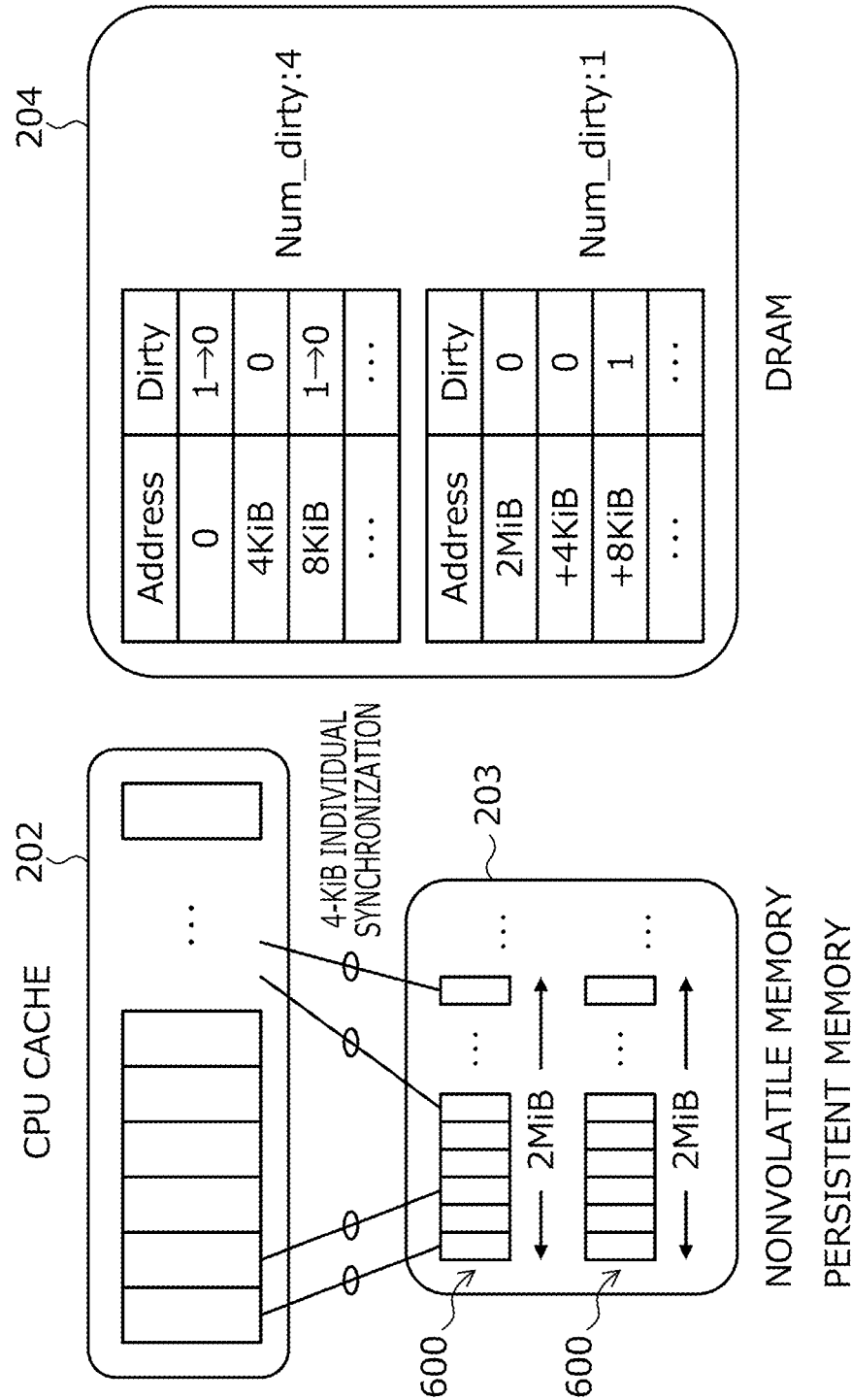
FIG. 9 is an explanatory diagram illustrating an example of performing a 4-KiB individual synchronization process.

FIG. 9 is an explanatory diagram illustrating an example of performing the 4-KiB individual synchronization process. In FIG. 9, it is assumed that the OS 300 determines to individually perform the 4-KiB individual synchronization process on each of the dirty pages among the 512 pages corresponding to the top area 600.

By individually performing the 4-KiB individual synchronization process on each of the dirty pages among the 512 pages corresponding to the top area 600, the OS 300 saves the stored contents of the page in the area 600. Here, the OS 300 initializes the flag information associated with the address of a page whose stored contents have been saved, to "0" in the dirty management table 400 that is stored in the DRAM 204 and corresponds to the top area 600.

This allows the OS 300 to perform the 4-KiB individual synchronization process when it is preferable to perform the 4-KiB individual synchronization process instead of the 2-MiB collective synchronization process from the viewpoint of processing time and to reduce the processing time. For example, if one of the 512 pages corresponding to any of the areas 600 is a dirty page, the OS 300 may achieve the speeding up by 91 times, as compared with a case where the 2-MiB collective synchronization process is performed on the 512 pages. Next, an example in which the OS 300 performs the 2-MiB collective synchronization process on the 512 pages corresponding to any of the areas 600 will be described with reference to FIG. 10.

Figure 10:
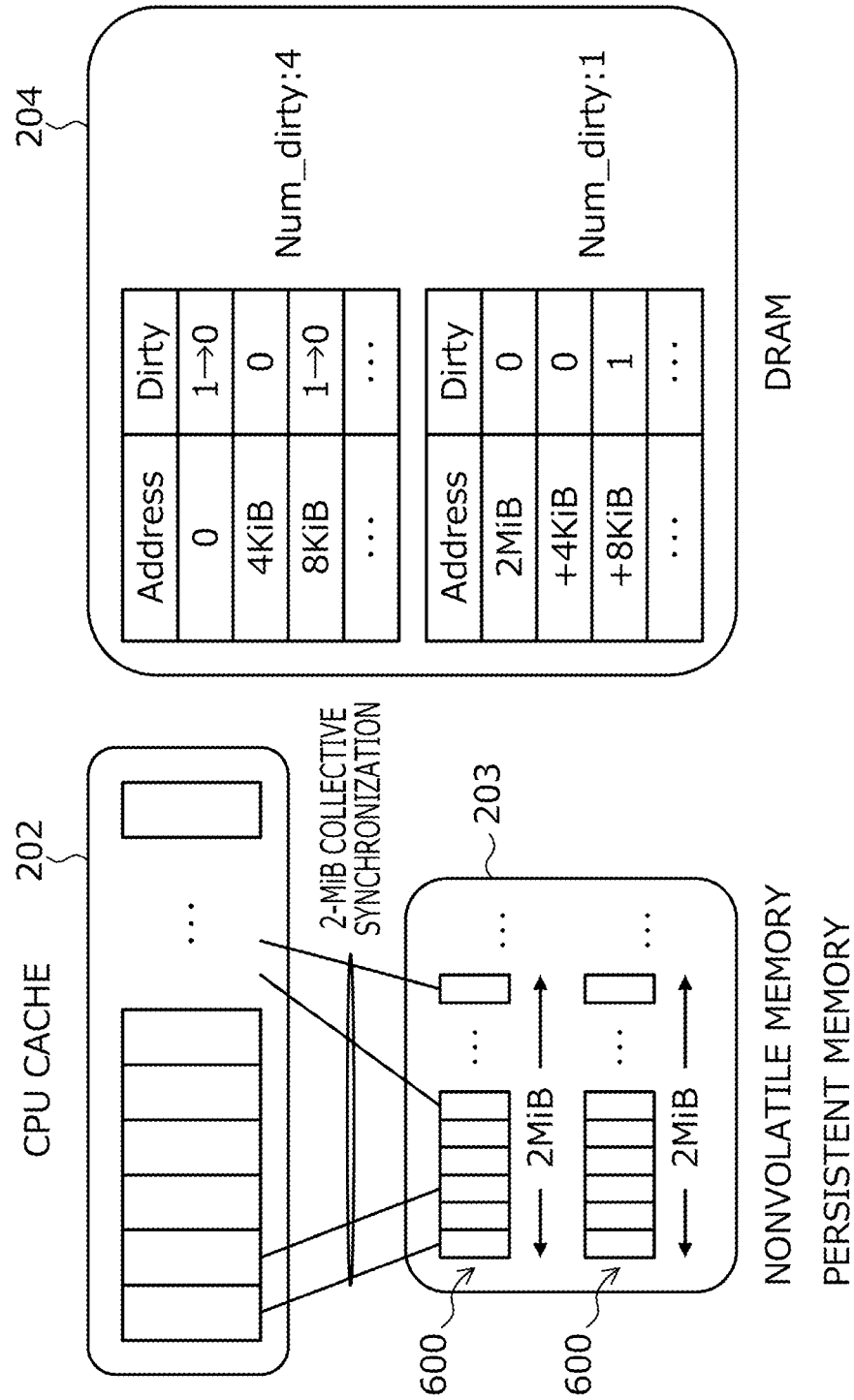
FIG. 10 is an explanatory diagram illustrating an example of performing a 2-MiB collective synchronization process.

FIG. 10 is an explanatory diagram illustrating an example of performing the 2-MiB collective synchronization process. In FIG. 10, it is assumed that the OS 300 determines to perform the 2-MiB collective synchronization process on the 512 pages corresponding to the top area 600.

The OS 300 saves the stored contents of the 512 pages in the area 600 by performing the 2-MiB collective synchronization process on the 512 pages corresponding to the top area 600. Here, the OS 300 initializes the flag information associated with the address of a page whose stored contents have been saved, to "0" in the dirty management table 400 that is stored in the DRAM 204 and corresponds to the top area 600.

This allows the OS 300 to perform the 2-MiB collective synchronization process when it is preferable to perform the 2-MiB collective synchronization process from the viewpoint of processing time and to reduce the processing time.

For example, if 91 or more of the 512 pages corresponding to any of the areas 600 are dirty pages, the OS 300 may reduce the processing time, as compared with a case where the 4-KiB individual synchronization process is performed on the 512 pages.

Here, a case where the OS 300 performs the 4-KiB individual synchronization process individually on all the dirty pages among the 512 pages corresponding to any of the areas 600 has been described, but the 4-KiB individual synchronization process is not limited to this case. For example, there may be a case where the OS 300 individually performs the 4-KiB individual synchronization process on some of the dirty pages among the 512 pages corresponding to any of the areas 600.

(Management Processing Procedure)

Next, an example of a management processing procedure executed by the information processing device 100 will be described with reference to FIG. 11. The management process is implemented by, for example, the CPU 201, a storage area of the DRAM 204 or the like, and the network I/F 205 illustrated in FIG. 2.

Figure 11:
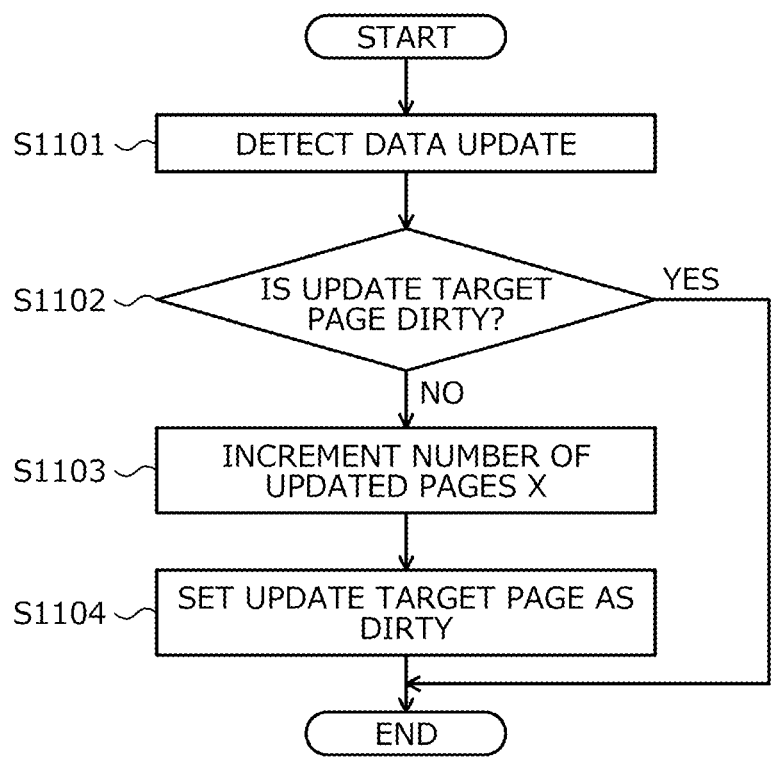
FIG. 11 is a flowchart illustrating an example of a management processing procedure.

FIG. 11 is a flowchart illustrating an example of the management processing procedure. In FIG. 11, the information processing device 100 detects a data update by the application 301 on any page contained in the CPU cache 202 (step S1101).

The information processing device 100 refers to the dirty management table 400 to verify whether or not an update target page, which is contained in the CPU cache 202 and has been subjected to the above data update, is dirty (step S1102). Here, when the update target page is not dirty (step S1102: No), the information processing device 100 proceeds to the process in step S1103. On the other hand, when the update target page is dirty (step S1102: Yes), the information processing device 100 ends the management process.

In step S1103, the information processing device 100 increments the number of updated pages X (step S1103). Next, the information processing device 100 sets the update target page as dirty using the dirty management table 400 (step S1104). Then, the information processing device 100 ends the management process. This allows the information processing device 100 to appropriately manage dirty pages.

(Synchronization Processing Procedure)

Next, an example of a synchronization processing procedure executed by the information processing device 100 will be described with reference to FIG. 12. The synchronization process is implemented by, for example, the CPU 201, a storage area of the DRAM 204 or the like, and the network I/F 205 illustrated in FIG. 2.

Figure 12:
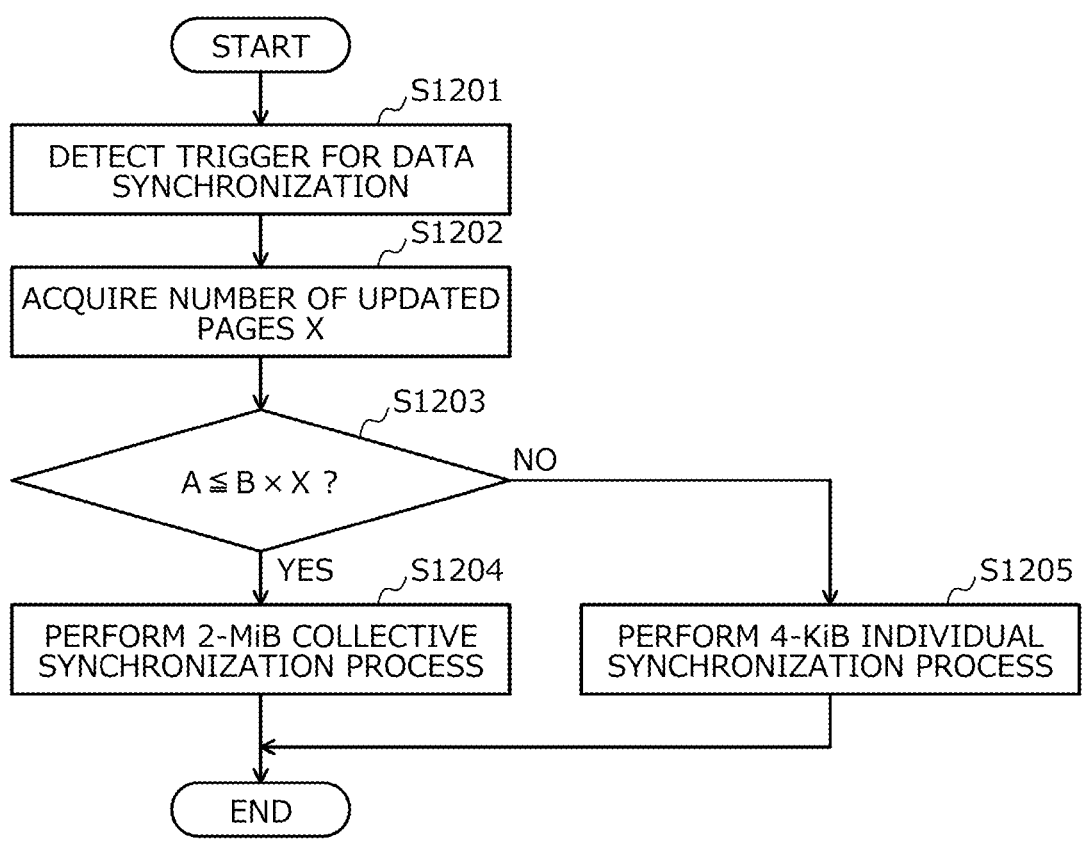
FIG. 12 is a flowchart illustrating an example of a synchronization processing procedure.

FIG. 12 is a flowchart illustrating an example of the synchronization processing procedure. In FIG. 12, the information processing device 100 detects the trigger for data synchronization (step S1201). Next, the information processing device 100 acquires the number of updated pages X (step S1202).

Then, the information processing device 100 verifies whether or not A≤B×X holds (step S1203). Here, when A≤B×X holds (step S1203: Yes), the information processing device 100 proceeds to the process in step S1204. On the other hand, when A≤B×X does not hold (No in step S1203), the information processing device 100 proceeds to the process in step S1205.

In step S1204, the information processing device 100 performs the 2-MiB collective synchronization process (step S1204). Then, the information processing device 100 ends the synchronization process.

In step S1205, the information processing device 100 performs the 4-KiB individual synchronization process (step S1205). Then, the information processing device 100 ends the synchronization process. This allows the information processing device 100 to synchronize the dirty page contained in the CPU cache 202 with the persistent memory 203 while reducing the processing time.

As described above, according to the information processing device 100, among a plurality of first areas that are contained in the cache storage area and allowed to be synchronized individually from each other with the nonvolatile storage area, the amount of the first areas subjected to data update may be specified. According to the information processing device 100, the first processing time taken for synchronization between the first area and the nonvolatile storage area may be specified. According to the information processing device 100, the second processing time taken for synchronization between the nonvolatile storage area and the second area that is formed by a plurality of first areas and allowed to be collectively synchronized with the nonvolatile storage area may be specified. According to the information processing device 100, based on the specified amount, the first processing time, and the second processing time, it may be determined whether the first areas subjected to data update are to be individually synchronized with the nonvolatile storage area or the second area is to be collectively synchronized with the nonvolatile storage area. This allows the information processing device 100 to reduce the processing time taken for synchronization.

According to the information processing device 100, information indicating whether or not data update has been made in each first area among the plurality of first areas may be acquired. According to the information processing device 100, the amount of the first areas subjected to data update among the plurality of first areas may be specified based on the acquired information. This allows the information processing device 100 to appropriately manage the first areas subjected to data update and to make it possible to specify the amount of the first areas subjected to data update.

According to the information processing device 100, when the specified amount is less than the threshold value based on the first processing time and the second processing time, it may be determined that the first areas subjected to data update among the plurality of first areas are to be individually synchronized with the nonvolatile storage area. According to the information processing device 100, when the specified amount is equal to or greater than the threshold value based on the first processing time and the second processing time, it may be determined that the second area is to be collectively synchronized with the nonvolatile storage area. This allows the information processing device 100 to accurately reduce the processing time taken for synchronization.

According to the information processing device 100, when a value obtained by multiplying the number of first areas subjected to data update by the first processing time is shorter than the second processing time, it may be determined that the first areas subjected to data update among the plurality of first areas are to be individually synchronized with the nonvolatile storage area. According to the information processing device 100, when a value obtained by multiplying the number of first areas subjected to data update by the first processing time is equal to or longer than the second processing time, it may be determined that the second area is to be collectively synchronized with the nonvolatile storage area. This allows the information processing device 100 to accurately estimate the processing time taken for synchronization and to enable synchronization in a relatively short processing time.

According to the information processing device 100, when it is determined that the first areas subjected to data update among the plurality of first areas are to be individually synchronized with the nonvolatile storage area, the first synchronization process that individually synchronizes the first areas subjected to data update with the nonvolatile storage area may be performed. According to the information processing device 100, when it is determined that the second area is to be collectively synchronized with the nonvolatile storage area, the second synchronization process that collectively synchronizes the second area with the nonvolatile storage area may be performed. This allows the information processing device 100 to implement synchronization.

According to the information processing device 100, when the first synchronization process is performed, the first information indicating the first processing time may be updated based on the needed time taken for the first synchronization process. According to the information processing device 100, when the second synchronization process is performed, the second information indicating the second processing time may be updated based on the needed time taken for the second synchronization process. This allows the information processing device 100 to make it possible to accurately specify the first processing time and the second processing time.

According to the information processing device 100, the process of specifying, the process of determining, and the process of performing may be executed on an OS. This allows the information processing device 100 to make synchronization appropriately controllable.

According to the information processing device 100, a persistent memory may be adopted as the nonvolatile storage area. This allows the information processing device 100 to be applied when the persistent memory is included.

According to the information processing device 100, a page contained in the cache storage area may be adopted as the first area. This allows the information processing device 100 to implement a system capable of synchronizing in units of pages.

Note that the information processing method described in the present embodiment may be implemented by executing a program prepared in advance, on a computer such as a PC or a workstation. The information processing program described in the present embodiment is executed by being recorded on a computer-readable recording medium and being read from the recording medium by the computer.

The recording medium is a hard disk, a flexible disk, a compact disc read only memory (CD-ROM), a magneto-optical disc (MO), a digital versatile disc (DVD), or the like. Furthermore, the information processing program described in the present embodiment may be distributed via a network such as the Internet.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing an information processing program for causing a computer to execute a process comprising:
   specifying an amount of first areas subjected to data update among a plurality of first areas that are contained in a cache storage area and allowed to be synchronized individually from each other with a nonvolatile storage area; and
   determining whether to individually synchronize the first areas subjected to the data update among the plurality of first areas with the nonvolatile storage area or collectively synchronize a second area that is formed by the plurality of first areas and allowed to be collectively synchronized with the nonvolatile storage area, with the nonvolatile storage area, based on the specified amount, a first processing time taken for synchronization between the first areas and the nonvolatile storage area, and a second processing time taken for synchronization between the second area and the nonvolatile storage area.

2. The non-transitory computer-readable recording medium storing the information processing program according to claim 1, wherein the specifying includes
   acquiring information that indicates whether or not the data update has been made in each first area among the plurality of first areas, and specifying the amount of the first areas subjected to the data update among the plurality of first areas based on the acquired information.

3. The non-transitory computer-readable recording medium storing the information processing program according to claim 1, wherein the determining includes
   determining to individually synchronize the first areas subjected to the data update among the plurality of first areas with the nonvolatile storage area when the specified amount is less than a threshold value based on the first processing time and the second processing time, and determining to collectively synchronize the second area with the nonvolatile storage area when the specified amount is equal to or greater than the threshold value based on the first processing time and the second processing time.

4. The non-transitory computer-readable recording medium storing the information processing program according to claim 1, wherein the amount is a number of the first areas subjected to the data update, and
   the determining includes
   determining to individually synchronize the first areas subjected to the data update among the plurality of first areas with the nonvolatile storage area when a value obtained by multiplying the number of the first areas subjected to the data update by the first processing time is shorter than the second processing time, and determining to collectively synchronize the second area with the nonvolatile storage area when the value obtained by multiplying the number of the first areas subjected to the data update by the first processing time is equal to or longer than the second processing time.

5. The non-transitory computer-readable recording medium storing the information processing program according to claim 1, which causes the computer to execute a process comprising:
   performing a first synchronization process that individually synchronizes the first areas subjected to the data update with the nonvolatile storage area when it is determined that the first areas subjected to the data update among the plurality of first areas are to be individually synchronized with the nonvolatile storage area; and performing a second synchronization process that collectively synchronizes the second area with the nonvolatile storage area when it is determined that the second area is to be collectively synchronized with the nonvolatile storage area.

6. The non-transitory computer-readable recording medium storing the information processing program according to claim 5, which causes the computer to execute a process comprising:

updating first information that indicates the first processing time based on a needed time taken for the first synchronization process when the first synchronization process is performed; and updating second information that indicates the second processing time based on the needed time taken for the second synchronization process when the second synchronization process is performed, wherein the determining includes determining whether to individually synchronize the first areas subjected to the data update among the plurality of first areas with the nonvolatile storage area or collectively synchronize the second area with the nonvolatile storage area, based on the specified amount, the first processing time indicated by the first information, and the second processing time indicated by the second information.

7. A computer-implemented information processing method comprising:

specifying an amount of first areas subjected to data update among a plurality of first areas that are contained in a cache storage area and allowed to be synchronized individually from each other with a nonvolatile storage area; and determining whether to individually synchronize the first areas subjected to the data update among the plurality of first areas with the nonvolatile storage area or collectively synchronize a second area that is formed by the plurality of first areas and allowed to be collectively synchronized with the nonvolatile storage area, with the nonvolatile storage area, based on the specified amount, a first processing time taken for synchronization between the first areas and the nonvolatile storage area, and a second processing time taken for synchronization between the second area and the nonvolatile storage area.

8. An information processing device comprising:

a memory; and a processor coupled to the memory, the processor being configured to perform processing, the processing including:

specifying an amount of first areas subjected to data update among a plurality of first areas that are contained in a cache storage area and allowed to be synchronized individually from each other with a nonvolatile storage area; and determining whether to individually synchronize the first areas subjected to the data update among the plurality of first areas with the nonvolatile storage area or collectively synchronize a second area that is formed by the plurality of first areas and allowed to be collectively synchronized with the nonvolatile storage area, with the nonvolatile storage area, based on the specified amount, a first processing time taken for synchronization between the first areas and the nonvolatile storage area, and a second processing time taken for synchronization between the second area and the nonvolatile storage area.

* * * * *